US006151038A

United States Patent [19]

Suzuki

[11] Patent Number: 6,151,038

[45] Date of Patent: *Nov. 21, 2000

[54] INK-JET IMAGE RECORDING APPARATUS FOR MULTI-PASS RECORDING

[75] Inventor: Akio Suzuki, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/562,560

[22] Filed: Nov. 24, 1995

[30] Foreign Application Priority Data

Nov. 24, 1994 [JP] Japan .................................... 6-289759

[51] Int. Cl.[7] .................................................... H04N 1/034

[52] U.S. Cl. ................................................................ 347/3

[58] Field of Search .................................. 347/3, 43, 41, 347/5, 9, 12, 14; 358/502

[56] References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,723,129 | 2/1988 | Endo et al. | 347/56 |
| 4,740,796 | 4/1988 | Endo et al. | 347/56 |
| 4,829,323 | 5/1989 | Suzuki et al. | 347/15 |
| 4,851,923 | 7/1989 | Abe et al. | 358/296 |
| 4,853,768 | 8/1989 | Suzuki et al. | 358/517 |
| 4,882,621 | 11/1989 | Suzuki et al. | 358/518 |
| 5,172,223 | 12/1992 | Suzuki et al. | 358/529 |
| 5,353,052 | 10/1994 | Suzuki et al. | 347/19 |
| 5,606,355 | 2/1997 | Komatsu | 347/14 X |

FOREIGN PATENT DOCUMENTS

| | | |
|---|---|---|
| 0532302 | 3/1993 | European Pat. Off. . |
| 0593283 | 4/1994 | European Pat. Off. . |
| 54-56847 | 5/1979 | Japan . |
| 59-123670 | 7/1984 | Japan . |
| 59-138461 | 8/1984 | Japan . |
| 60-71260 | 4/1985 | Japan . |
| 4-216566 | 8/1992 | Japan . |

*Primary Examiner*—N. Le
*Assistant Examiner*—Michael Nghiem
*Attorney, Agent, or Firm*—Fitzpatrick, Cella, Harper & Scinto

[57] ABSTRACT

An ink-jet recording apparatus reads in advance an original with an image to be recorded and, on the basis of the read image data, executes color image recording for each band while driving ink-jet heads for scanning. The apparatus obtains the requisite ink amount of each color (the cumulative number of times that ejection is effected) for recording the image of this original, $C_T$, $M_T$, $Y_T$, $Bk_T$, on the basis of which a judgment is made as to what combination of colors minimizes the ejection amount in each scanning. In accordance with the result of this judgment, inks of the colors of each combination are ejected in first and second scanning passes, whereby it is always possible to obtain the benefits of divisional recording, such as beading prevention, regardless of the kind of image to be recorded.

12 Claims, 4 Drawing Sheets

INK-JET IMAGE RECORDING APPARATUS FOR MULTI-PASS RECORDING

BACKGROUND OF THE INVENTION

1. Field of the Invention

The present invention relates to an ink-jet image recording apparatus and, in particular, to an ink-jet image recording apparatus which records on the same recording area by using a plurality of different ink-jet heads for different recording operations.

2. Description of the Related Art

Ink-jet type image recording apparatuses are generally known as copying machines, printers, etc. Since the principle on which they record is a non-impact type, they are quiet and easily allow color recording. Nowadays, they are being achieving widespread use due to these advantages.

In a color image forming apparatus, which records images in a plurality of colors, a plurality of (for example, four) ink-jet heads are arranged in the scanning direction at predetermined intervals on a carriage that is adapted to move for scanning along a guide shaft oriented parallel, for example, to a sheet feeding roller, and inks of different colors, such as cyan, magenta, yellow and black, are ejected from the ink-jet heads to thereby form a color image on a recording sheet.

Generally speaking, a recording sheet used in an image recording apparatus of this type is required to have the ability to absorb ink quickly. In the case of a recording sheet that cannot absorb ink to a sufficient degree, when a large amount of ink is ejected onto the sheet over a relatively short time, it takes time for the ink on the sheet to permeate and be absorbed, so that some droplets of ink will be allowed to spread during that time on the sheet and join other droplets to grow into larger droplets of ink. In that case, the ink dots to be formed are not recorded at the proper positions and in the proper configuration, and a stripe-like pattern is generated on the entire image, so that the resultant image looks rather rough. This phenomenon is generally called beading. Further, when the absorption of ink is incomplete, the portion of ink which is not absorbed by the sheet but remains thereon will disturb the image to be formed or stain the interior of the recording apparatus.

To solve this problem, which is attributable to incomplete ink absorption, it is known to coat a recording sheet with a material which excels in ink absorptively.

However, in the case of a special type of recording sheet, there is a limitation in terms of the kind of material to be used for the coating, so, in some cases, such absorptively as can be obtained with an ordinary type of coated recording paper cannot be expected. For example, in an OHP sheet, the coating material must be transparent, so that a coating material used in ordinary recording papers, which contains silica as the main material, cannot be used. Further, while in the case of an ordinary coated recording paper, the paper portion constituting the base layer also absorbs ink, the transparent film of an OHP sheet does not absorb ink, so that the ink absorptively of an OHP sheet is inferior to that of ordinary recording papers. Thus, an OHP sheet is more liable to give rise to the problems described above.

To cope with these problems, the present applicant has proposed a recording method according to which, where recording is usually performed in a single scan by ejecting inks of the four colors of cyan, magenta, yellow and black, scanning is effected two times, recording being performed by ejecting cyan and black inks at the first scanning and magenta and yellow inks at the second scanning.

In this method, the amount of ink ejected onto the recording sheet in one scanning can be reduced by half, thereby making it possible to avoid the above problems. Although this method requires twice the recording time as the above arrangement of ink-jet heads, the ink-jet heads for cyan and black are most spaced away from each other, so that, even if the two inks are ejected during the same scan, the time elapsing between the ejection of cyan ink and that of black ink is relatively long, which mean beading is not so easily generated. In view of this, cyan and black inks are ejected during the same scan. As to which of the two pairs of colors is to be used first for scanning, it is expedient to use that pair first which is more liable to the generation of beading. This is due to the fact that, in some cases, beading can be generated easily when ink ejection is effected by using a pair of colors which is more liable to the generation of beading in a condition in which ink has already been ejected, that is, in a condition in which the absorptively of the sheet has been reduced.

In view of the above, in the double pass scanning mode, setting is effected such that cyan and black inks are ejected in the first scanning pass, and that magenta and yellow inks are ejected in the second scanning pass.

However, in some cases, the effect of the double pass scanning cannot be obtained to a sufficient degree with the above combination, depending upon the kind of image to be recorded. For example, when recording an image whose color is substantially only red, the above combination cannot provide the expected effect of the double pass scanning. To compared to the case in which inks of all the colors are ejected in a single scan, it proves substantially effective in terms of image quality. In view of this, it is expedient to provide a single-pass mode for high-speed recording and a double pass scanning mode for high image quality so that it is possible to select between the two modes according to the purpose, which arrangement enables the apparatus as a whole to be improved in terms of efficiency.

Generally speaking, in the case of the double pass scanning mode, the combination of the color of inks to be ejected in each scan is determined, taking various factors into consideration, such that the effect of the double pass scanning is maximum for average images. In some cases, however, when the combination is fixed, the effect of the double pass scanning cannot be obtained to a satisfactory degree, depending upon the kind of image to be recorded.

This problem will be explained taking as an example an apparatus in which four ink-jet heads of cyan, magenta, yellow and black are arranged in this order. According to the results of examinations conducted by the present applicant, when recording in different colors superimposed one upon the other, beading is least conspicuous when magenta and yellow are superimposed one upon the other. Thus, it is desirable to combine magenta and yellow so that they may be ejected in the same scanning pass. Further, in reproduce the color red, magenta and yellow colors are superimposed one upon the other. In the above combination, however, these two colors are ejected during the same scan, so that the effect to be obtained by the double pass scanning cannot be expected.

In this way, the combination providing the maximum effect is determined by the combination of inks ejected at each scanning, which is set in advance, so that, in some cases, the effect of the double pass scanning cannot be obtained at all, depending upon the kind of image to be recorded.

The above problem is more conspicuous in the construction described below: for example, in a copying machine serving as a color image recording apparatus, it is becoming general practice to provide a mono-color mode in which the entire original is copied in a designated color. In this case also, the effect of the double pass scanning may not be obtained depending upon the color designated in the mono-color mode.

The colors that can be selected in the mono-color mode are the seven colors of cyan, magenta, yellow, black, red, green and blue. Of these colors, when, for example, red is selected for mono-color recording, the above-described effect of the double pass scanning cannot be obtained.

SUMMARY OF THE INVENTION

One aspect of this invention is an ink-jet image recording apparatus employing scannable ink-jet heads for ejecting different kinds of ink onto a recording medium to thereby record an image. This apparatus includes recording control means for controlling recording operations to effect ejection on a same area on the recording medium, with the ink-jet heads used differing from a given recording operation to another said recording operation. A detection means detects an image to be recorded before the recording thereof by the ink jet heads, and controlling means controls a recording condition regarding the plural recording operations, in which different ink-jet heads are used with respect to the same area, in accordance with the image detected by the detection means.

Another aspects of this invention relates to an ink-jet image recording apparatus employing scannable ink-jet heads for ejecting different kinds of ink onto a recording medium to record an image, and in includes a recording control means for controlling recording operations to effect ejection on a same area of the recording medium, so that the ink-jet heads used in a given recording operation differ from those ink jet heads used in another recording operation. A mode setting means sets a mode in which an image is recorded by mono-color recording, a selection means selects a selected color for the mono-color recording, and a controlling means controls the recording condition regarding the plural recording operations, in which different ink-jet heads are used to record on the same area, according to the selected color selected by the selected means.

Still another aspect of this invention is an ink-jet image recording apparatus which performs scanning using ink-jet heads for ejecting different color inks with respect to a recording medium, and it includes a recording control means for controlling recording by scanning different ink-jet heads multiple times on a same scanning area, mode setting means for setting a mode in which an image is recorded by mono-color recording, and selection means for selecting a selected color for the mono-color recording. When the selected color is a color to be recorded by an ink-jet head for an ink of a single color, the recording operation in which scanning for recording with different ink-jet heads is performed plural times with respect to the same scanning area is not executed.

A further aspect of this invention is an ink-jet image recording apparatus having ink-jet heads for ejecting inks onto a recording medium while scanning the heads with respect to the recording medium, controls mean for controlling recording so that when recording is performed by scanning the same scanning area several times, an order of ejection of the different inks in the scanning executed plural times differs according to the kind of recording medium used in the recording.

A still further aspect of this invention is a method for recording images which includes the step of: providing an ink-jet image recording apparatus employing a plurality of scannable ink-jet heads for ejecting different kinds of inks from said plurality of ink-jet heads onto a recording medium to thereby record an image; detecting an image to be recorded before the recording thereof by said ink jet heads; setting a recording condition regarding a plurality of times of recording operations for the image, in which different ink-jet heads are used with respect to a same area, in accordance with the image detected in said detecting step; and performing the plurality of recording operations to effect ejection on the same area of the recording medium, with the ink-jet heads used differing from a given said recording operation to an other said recording operation in accordance with the recording condition set in said setting step.

A still further aspect of this invention is a method for recording images, which includes the steps of: providing an ink-jet image recording apparatus employing a plurality of scannable ink-jet heads for ejecting different kinds of inks onto a recording medium to thereby record an image; setting a mode in which an image is recorded by mono-color recording; selecting a selected color for the mono-color recording; setting a recording condition regarding plural recording operations for the image, in which different said ink-jet heads are used to record on a same area, in accordance with the selected color selected in said selecting step; and performing the plurality of recording operations to effect ejection on the same area of the recording medium, such that the ink-jet heads used in a given said recording operation differ from the ink jet heads used in an other recording operation in accordance with the recording condition set in said setting means.

A still further aspect of this invention is a method for recording images, which includes the steps of: providing an ink-jet image recording apparatus which performs scanning employing a plurality of ink-jet heads for ejecting inks of different colors with respect to a recording medium to thereby record an image; setting a mode in which an image is recorded by mono-color recording; selecting a selected color for the mono-color recording; and controlling recording by scanning different ink-jet heads a plurality of times on a same scanning area. When said selected color is a color to be recorded by an ink-jet head for an ink of a single color, the recording operation in which scanning for recording with different ink-jet heads is performed a plurality of times with respect to the same scanning area is not executed.

A still further aspect of this invention is a method for recording images, comprising the steps of: providing an ink-jet image recording apparatus employing a plurality of ink-jet heads for ejecting different inks onto a recording medium while scanning said ink-jet heads with respect to the recording medium to thereby effect recording; recording by scanning the same scanning area a plurality of times; and controlling an order of ejection of said different kinds of inks in said scanning executed a plurality of times so as to differ according to a kind of recording medium used in the recording.

DETAILED DESCRIPTION OF THE PREFERRED EMBODIMENTS

Embodiments of the present invention will now be described in detail with reference to the drawings.

(First Embodiment)

Figure 1:
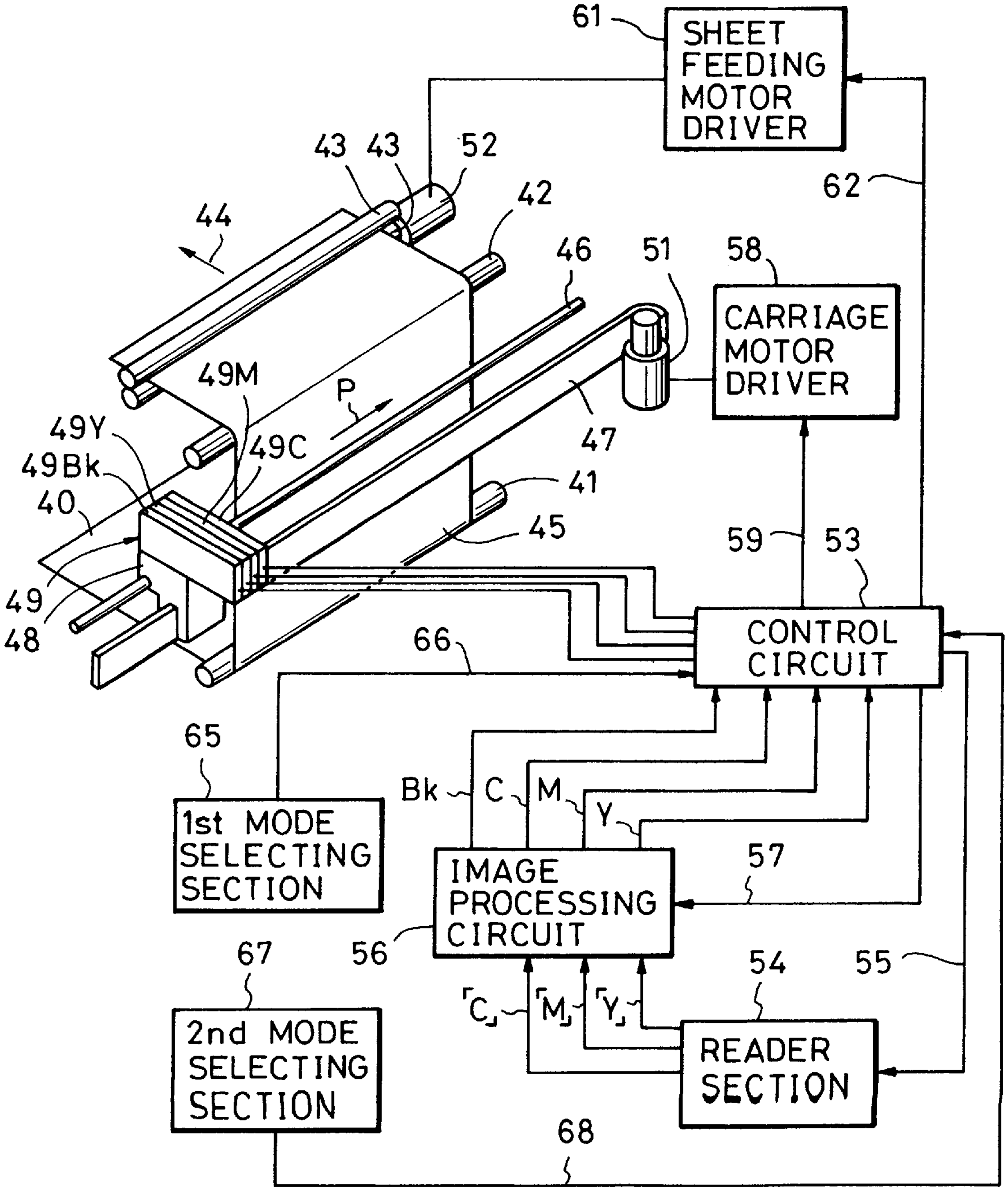
FIG. 1 is a schematic diagram showing an image recording apparatus according to a first embodiment of the present invention.

FIG. 1 is a diagram illustrating a color ink-jet recording apparatus according to an embodiment of the present invention and the control system thereof.

In FIG. 1, a recording sheet 40 serving as the recording medium is fed in the direction of an arrow 44 in the drawing as it is held between a pair of feeding rollers 43, one of which is driven by a sheet feeding motor 52. A guide shaft 46 is provided so as to extend across a portion 45 of the recording sheet 40, and a carriage 48 can move as it is guided by this shaft, whereby a plurality of ink-jet heads 49C, 49M, 49Y and 49Bk, which are mounted on the carriage 48, reciprocate to thereby perform scanning for recording.

As stated above, the carriage 48 carries ink-jet heads for four recording colors: the head 49C for cyan ink, the head 49M for magenta ink, the head 49Y for yellow ink and the head 49Bk for black ink, which are arranged in this order, with an ink tank of the corresponding ink being connected to each ink-jet head.

As the carriage moves for scanning in the direction indicated by an arrow P in the drawing, recording is effected across the width of the ejection holes arranged on the ink-jet heads. After this, the recording sheet 40 is fed in the direction of the arrow 44 by a distance corresponding to the width mentioned above. These procedures are repeated to thereby effect color image recording. In this embodiment, each ink-jet head has 256 ejection holes that are arranged with a density of 400 DPI, so that the above-mentioned width covered by one scanning is 16.256 mm.

The carriage 48 reciprocates in response to the driving force of a carriage motor (pulse motor) 51, which driving force is transmitted through a timing belt 47 and, as stated above, the feeding roller 43 is rotated by the sheet feeding motor 52.

A control circuit 53 for executing the control of the recording operation is composed of a CPU, a ROM storing programs to be executed by the CPU, a RAM for storing data, etc. The control circuit 53 outputs a reader control signal 55 to a reader section (or a computer) 54, and, in response to this, receives reading data. To an image processing circuit 56, it outputs an image processing control signal 57, and, to each of the the ink-jet heads 49C, 49M, 49Y and 49Bk, it outputs ejection data and a head control signal. Further, timed to the ejection timing of the ink-jet heads, it outputs a carriage motor control signal 59 to a carriage motor driver 58, and, to a sheet feeding motor driver 61, it outputs a sheet feeding motor control signal 62.

From the reader section 54, reading date, for each of the colors of inks, "C", "M", "Y", is input to the image information processing circuit 56 for image processing. The data C, M, Y, input from the reader section 54, is obtained by effecting logarithmic conversion on a red signal R, a green signal G and a blue signal B that are read by a CCD in the reader section 54 and inverting the value thereof.

In the image processing circuit 56, black extraction is first performed on this signal.

$$Bk=Min\ (C, M, Y) \quad (1)$$

Then, a masking process shown by the following equations is effected:

$$C'=a_{11}C+a_{12}M+a_{13}Y+a_{14}Bk$$

$$M'=a_{21}C+a_{22}M+a_{23}Y+a_{24}Bk$$

$$Y'=a_{31}C+a_{32}M+a_{33}Y+a_{34}Bk$$

$$Bk'=a_{41}C+a_{42}M+a_{43}Y+a_{44}Bk \quad (2)$$

In the above equations, the coefficients $a_{11}$~$a_{44}$ are set so as to provide an optimum color reproducibility.

The data C', M', Y', Bk' thus obtained are supplied to the control circuit 53, which outputs ejection signals to the ink-jet heads 49C, 49M, 49Y and 49Bk on the basis of these image signals, and the ink-jet heads eject inks of the respective colors on the basis of these signals.

The recording apparatus of this embodiment, described above, is usually set so as to use inks of the four colors of C, M, Y and Bk in one scanning pass the carriage to perform color recording. When high image quality is desired with a recording sheet having a rather poor ink absorptively, the operator performs, for example, a predetermined key operation at a first selecting section 65 to select a double pass scanning mode.

Figure 2:
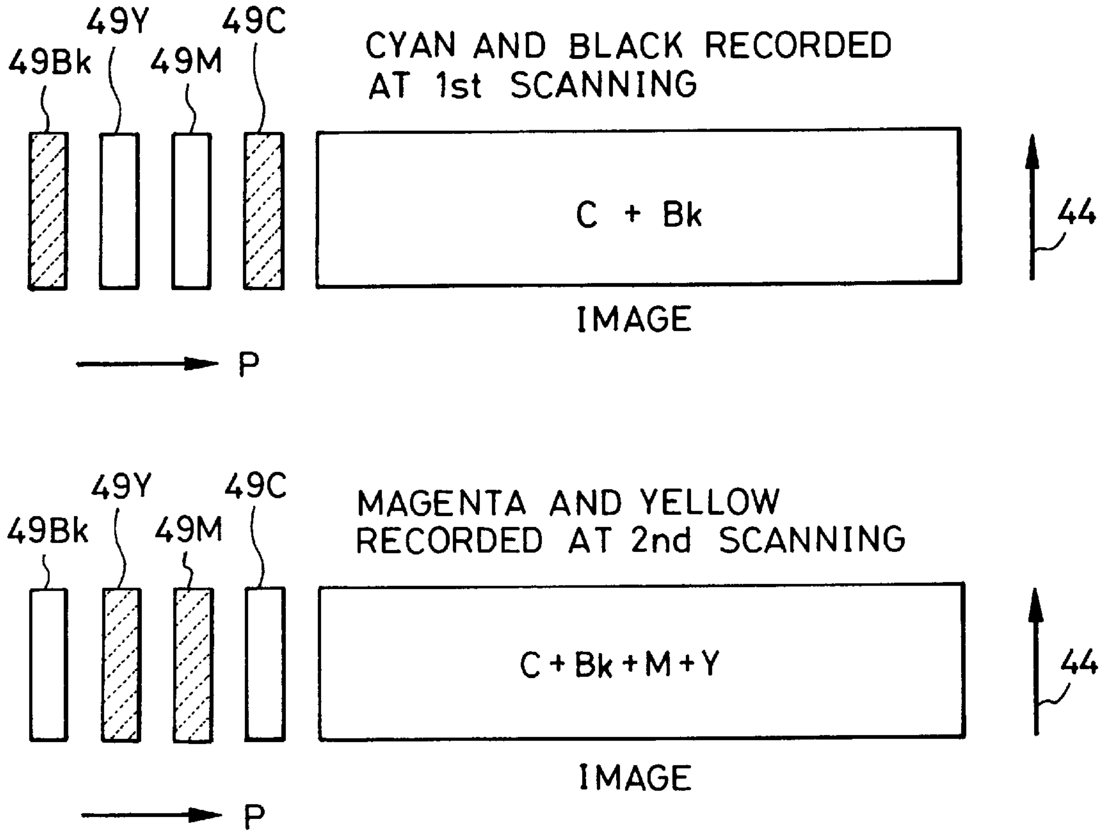
FIG. 2 is a diagram illustrating a conventional image recording method based on a multiple-pass scanning system.

When the double pass scanning mode is selected, a double pass scanning control signal 66 are supplied to the control circuit 53 to control the ink ejection of each ink-jet head, the carriage motor driver 58 and the sheet feeding motor driver 61, thereby performing recording as shown in FIG. 2.

In FIG. 2, in a first forward scanning pass of the carriage 48 (the scanning in the direction indicated by the arrow P of FIG. 1), recording is performed using the two ink-jet heads 49C and 49Bk for cyan and black. Then, without feeding the recording sheet, recording is effected through a second scanning pass by using the two ink-jet heads 49M and 49Y. When these two scanning operations have been completed, the recording sheet is fed in the direction of the arrow 44 of FIG. 1, as stated above, by a distance corresponding to the arrangement width of the ejection holes of the ink-jet heads. After this, the above sequence is repeated to thereby effect image recording.

Figure 3:
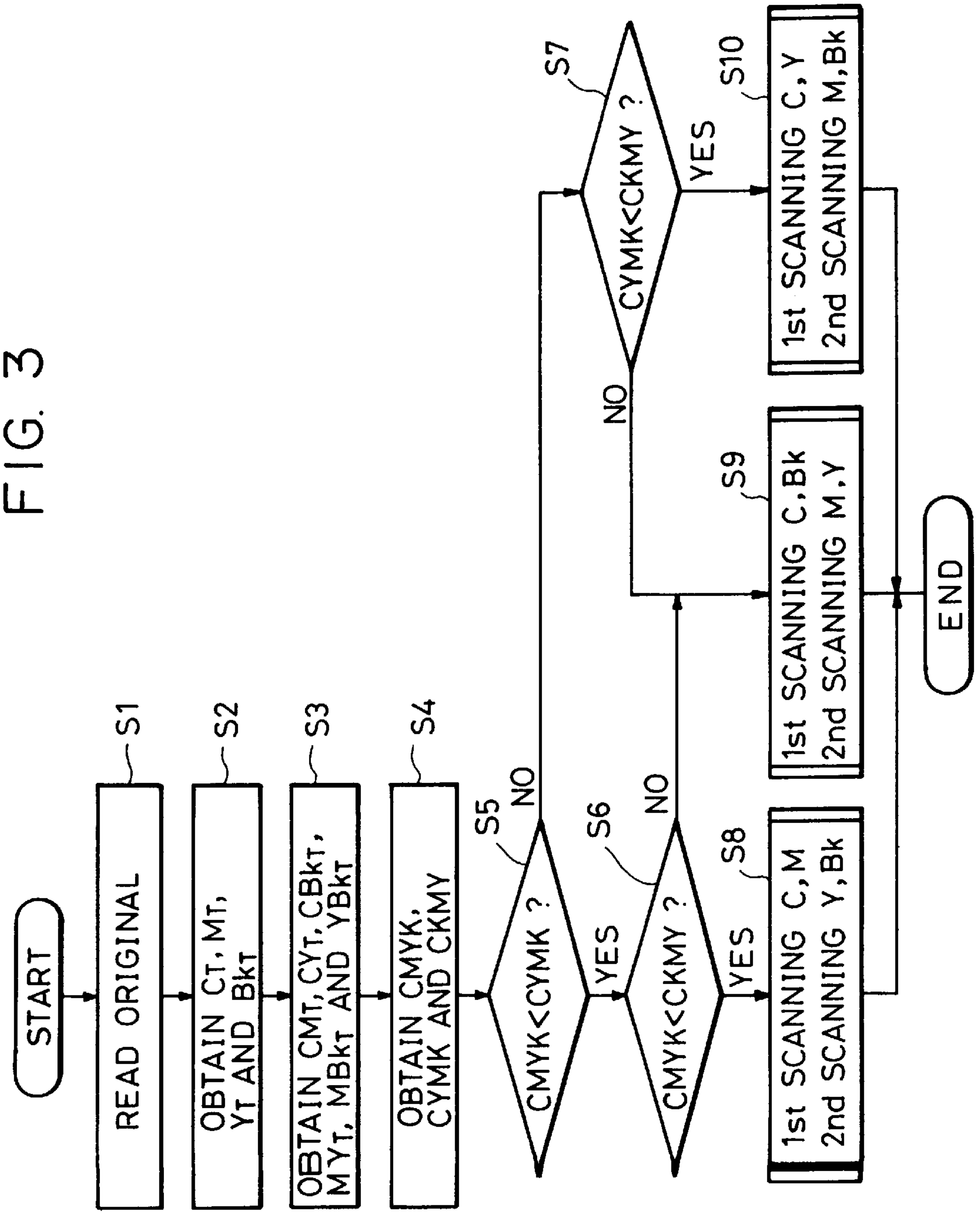
FIG. 3 is a flowchart showing procedures according to the first embodiment of the present invention.

A second mode selecting section 67 serves to read the original in advance and allows selection of a mode for determining the combination of heads in the double pass scanning in the mode selected by the first made selecting section 65. In the following, the processing of the second mode will be described with reference to FIG. 3.

When the double pass scanning mode is selected by the first mode selecting section 65 and, further, the second mode is selected by the second mode selecting section 67, a pre-scan mode signal 68 are supplied to the control circuit 53 (See FIG. 1). When the apparatus has entered into the second mode in response to this mode signal, the control circuit 53 controls the reader section 54 by the reader control signal 55 and causes it to read the (original in advance. (Step S1 of FIG. 3. Hereinafter, only the step numbers will be given). The reader section 54 reads the original and transmits the reading signals, the C, M, and Y signals, to the image processing circuit 56. The image processing section 56 performs masking processing as shown by the above equation (2) on these signals to thereby obtain C', M', Y', Bk', and transmits them to the control circuit 53. On the basis of these signals, the control circuit 53 obtains ejection data for each ink-jet head, which is "1" for ejection and "0" for non-ejection, and obtains, for each ink-jet head, a signal of the value of this data accumulated in an amount corresponding to one page as $C_T$, $M_T$, $Y_T$, $Bk_T$.

(Step S2).

Subsequently, the control circuit 53 obtains signals indicating the following values (Step S3):

$$CM_T=(C_T+M_T)$$

$CY_T=(C_T+Y_T)$ $CBk_T=(C_T+Bk_T)$ $MY_T=(M_T+Y_T)$ $MBk_T=(M_T+Bk_T)$ $YBk_T=(Y_T+Bk_T)$ $CM_T$ is a signal indicating the amount of ink when cyan and magenta inks are ejected by the same scanning. Similarly, $CY_T$ is a signal indicating the amount of ink when cyan and yellow inks are ejected; $CBk_T$ is a signal indicating the amount of ink when cyan and black inks are ejected; $MY_T$ is a signal indicating the amount of ink when magenta and yellow inks are ejected; $MBk_T$ is a signal indicating the amount of ink when magenta and black inks are ejected; and $YBk_T$ is a signal indicating the amount of ink when yellow and black inks are ejected.

Next, in step S4, the following signals are obtained:

$CMYK=MAX.\ (CM_T,\ YBk_T)$ $CYMK=MAX.\ (CY_T,\ MK_T)$ $CKMY=MAX.\ (CK_T,\ MY_T)$

CMYK is a signal indicating the amount of ink of the pair of ink-jet heads of the larger ink amount when the combination of the cyan and magenta ink-jet heads is used for the first (or the second) scanning pass and the combination of the yellow and black ink-jet heads is used for the second (or the first) scanning pass. Similarly, CYMK is a signal indicating the amount of ink of the pair of ink-jet heads of the larger ink amount when the combination of cyan and yellow and the combination of magenta and black are used; and CKMY is a signal indicating the amount of ink of the pair of ink-jet heads of the larger ink amount when the combination of cyan and black and the combination of magenta and yellow are used. It is desirable to select in this mode the combination of ink-jet heads in which the above value is as small as possible. When the values are large, the amount of ink ejected by the same scanning is large, so that the above-described problems, such as beading, are likely to be generated. The present invention can be naturally executed in the case in which the combination of the smaller ink amount is considered at the same time. However, when the amount of ink is less than a fixed value, the possibility of the above problems being generated is low, so that this embodiment employs the algorithm in which only the combination of the larger ink amount is considered.

From the results obtained in the processing of step S4 described above, the control circuit 53 obtains a combination in which the value of the amount of ink of the pair of the larger ink amount is minimum (steps S5, S6 and S7).

When CMYK gives the minimum value of ink amount, the recording operation is conducted in step S8 by using the cyan and magenta ink-jet heads for the first scanning pass and the yellow and black ink-jet heads for the second scanning. When CYMK gives the minimum value, recording operation is performed in step S10 by using the cyan and yellow ink-jet heads for the first scanning pass and the magenta and black ink-jet heads for the second scanning. When CKMY gives the minimum value, the recording operation is performed in step S9 by using the cyan and black ink-jet heads for the first scanning pass and the magenta and yellow ink-jet heads for the second scanning pass.

As described above, by reading in advance the original to be actually recorded and determining the condition of optimum head combination for the second scanning pass, it is possible to obtain the effect of the double pass scanning independently of the kind of image to be recorded.

(Modification of the First Embodiment)

While the above embodiment has been described with reference to the case in which the double pass scanning mode is used for the purpose of attaining high image quality, a satisfactory image quality cannot be obtained, in some cases, simply by dividing one scanning pass in half, depending upon the kind of image to be recorded. This embodiment addresses such cases.

Figure 4:
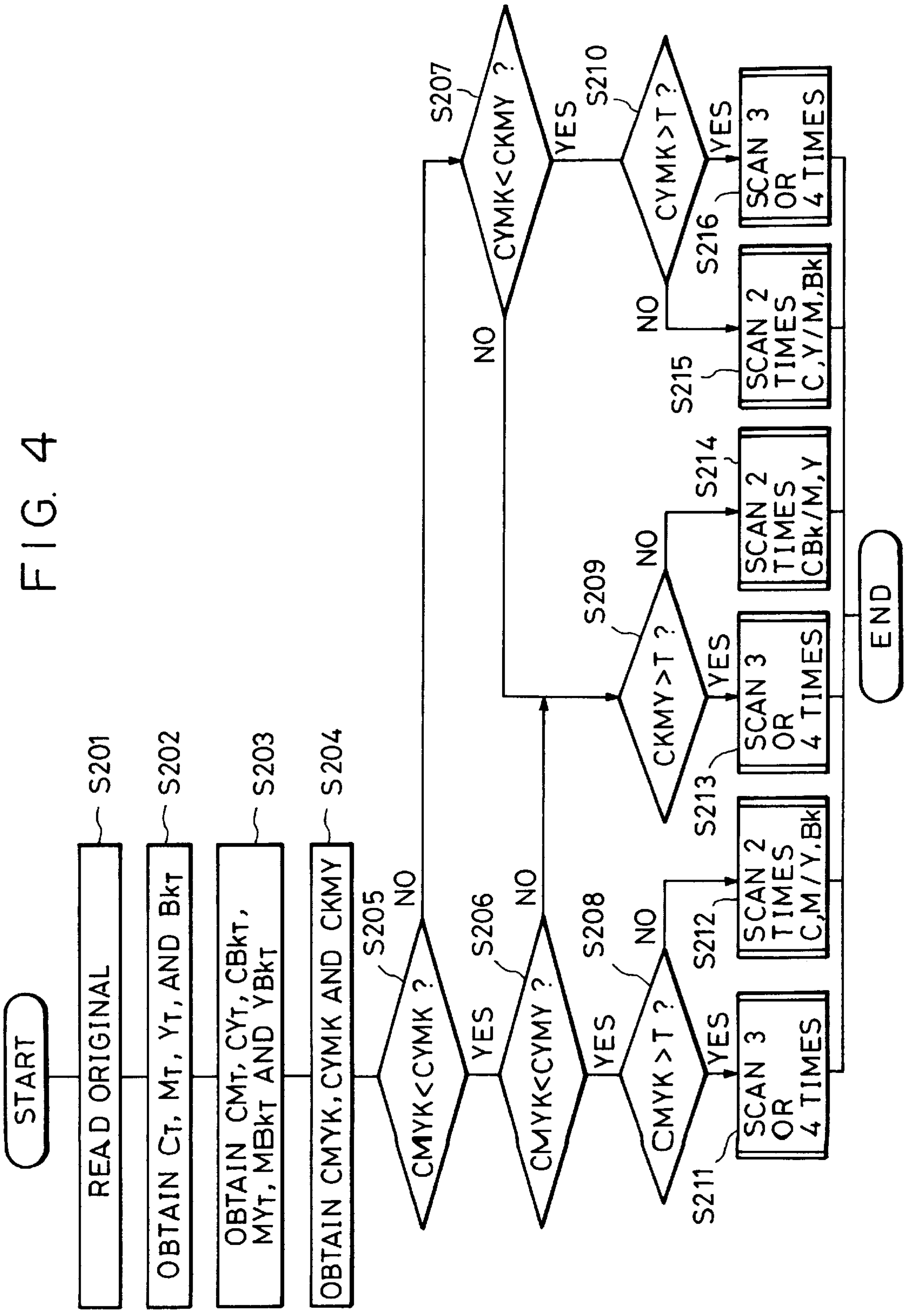
FIG. 4 is a flowchart showing procedures according to a modification of the first embodiment.

Generally speaking, the amount of ink that allows recording by one scanning pass without causing problems such as beading is determined by the recording sheet. Assuming that the maximum value of an image signal that can be recorded by one scanning pass without causing any problem with the sheet used in this embodiment is T, the basic head combination is determined in this embodiment, as shown in FIG. 4, through the procedures of steps S201~S207, as in the first embodiment.

Subsequently, in steps S208 through S210, a judgment is made as to whether the amount of ink ejected by one scanning pass using this combination exceeds the above value T or not. If T is not exceeded, control procedures similar to those of the first embodiment are executed (steps S211, S214 and S215). When the amount ink ejected exceeds the value T, the number in which one scanning pass is divided is increased so that T will not be exceeded. For example, when it is determined in step S206 that the minimum combination is CMYK and that this exceeds T (step S208), image recording is executed by performing scanning four times, with one scanning pass for one color, if both $CM_T$ and $YBk_T$ are in excess of T. If only one of them exceeds T, the combination exceeding T is further divided into two scanning stages, effecting image recording by performing scanning three times in total (step S211).

By the above construction, it is possible to obtain the benefits of multiple scanning passes more reliably.

(Another Modification of the First Embodiment)

While in the first embodiment and the modification thereof described above the entire original is read to determine the condition for the multiple scarning passes, there can be, in some originals, a local variation in the optimum condition. This embodiment is concerned with such cases.

In this embodiment, the reading of the original is effected for each of the scanning areas of the original. That is, the original is read by an area having a width of 16.256 mm in correspondence with the areas to be scanned for recording and, on the basis of the results of this scanning, the recording condition is controlled with respect to each scanning area. As to the control procedures it is possible to adopt any of those already described with reference to the above embodiments. In any case, reading is executed for each scanning area, recording being performed after determining the optimum number of recording passes.

By the above construction, it is possible to set the optimum condition for each scanning area, so that, even if the optimum condition varies from place to place in the same image, it is possible to achieve the greatest benefits of the multiple scanning passes.

Although in the above embodiments the reading of the image is executed with respect to the entire image, it is also possible to perform sampling with respect to several points on the original. As for the reading means for performing reading, it will be expedient if it is same as that used for reading the image to be recorded since that will simplify the apparatus construction. However, it is not always necessary for them to be same means. For example, since a particularly high level of reading accuracy is not required of the reading means, the reading may be roughly effected by an inexpensive reading means, thereby advantageously reducing the requisite time for pre-scanning.

Further, while the above embodiments have been described with reference to an apparatus in which originals are read by a reader section, this should not be construed restrictively. It is also possible to adopt a system in which an image signal is directly input from a computer, a memory device or the like. In this case, the control circuit first performs sampling on the input image signal before recording is started, and the condition for the multiple scanning passes is determined by the above-described process, image recording being effected through multiple recordings in accordance with the condition determined.

(Second Embodiment)

The apparatus structure in this embodiment is the same as that shown in FIG. 1. That is, the operator selects the double pass scanning mode by the first mode selecting section 65. Further, in this case, when the mono-color mode is selected by the second mode selecting section 67, the processing described below is performed, in which mono-color recording according to an embodiment of the present invention is executed by double-pass scanning.

When the mono-color mode is selected, the mono-color selection signal 68 is supplied to the image processing circuit 56 (See FIG. 1). In this mode, the achromatic color density ND of the image is calculated as follows on the basis of the reading signals C, M, Y.

$$ND=(C+M+Y)/3 \quad (3)$$

Next, the C, M, Y signals to be input to the masking processing circuit are all replaced by the ND signal. Thus, the masking calculation is as follows:

$$C'=(a_{11}+a_{12}+a_{13}+a_{14})\ ND$$

$$M'=(a_{21}+a_{22}+a_{23}+a_{24})\ ND$$

$$Y'=(a_{31}+a_{32}+a_{33}+a_{34})\ ND$$

$$Bk'=(a_{41}+a_{42}+a_{43}+a_{44})\ ND \quad (4)$$

Further, the color to be used in the mono-color mode is selected. In this embodiment, it is possible to select from among the seven colors of cyan, magenta, yellow, black, red, green and blue. When, for example, cyan is selected from these colors, the masking coefficients are changed such that $$a_{11}+a_{12}+a_{13}+a_{14}=1$$

$$a_{21}+a_{22}+a_{23}+a_{24}=0$$

$$a_{31}+a_{32}+a_{33}+a_{34}=0$$

$$a_{41}+a_{42}+a_{43}+a_{44}=0$$

Specifically, $a_{11}=1$, and the remaining coefficients are all set to 0.

Due to the above arrangement, image recording in the single color of cyan is effected in accordance with the achromatic color density of the original image. Similarly, when magenta is selected, only $a_{21}$ is set to 1, and the remaining coefficients are all set to 0. When yellow is selected, only $a_{31}$ is set to 1, and the remaining coefficients are all set to 0. When black is selected, only $a_{41}$ is set to 1, and the remaining coefficients are all set to 0.

When red is selected, a coefficient setting is made such that $a_{21}=a_{31}=1$, and the remaining coefficients are all set to 0. As a result, recording is effected in solely magenta and yellow, whereby a recording image in the single color of red is obtained.

When green is selected, a coefficient setting is made such that $a_{11}=a_{31}=1$, and the remaining coefficients are all set to 0.

When blue is selected, the coefficient setting is made such that $a_{11}=a_{21}=1$, and the remaining coefficients are all set to 0. In this way, it is possible to obtain a mono-color image by controlling the masking coefficients in accordance with the color selected.

If, in the condition in which the above mono-color mode has been selected by the second mode selecting section 67, the double pass scanning mode is further selected by the first mode selecting section 65, the following processing is executed:

In this process, the combination of colors to be used for recording by the same scanning is switched in principle in accordance with the selected color. When the selected color is one of the colors cyan, magenta, yellow and black, ejection is effected in the first scanning pass in the case of cyan or black, and in the second scanning pass in the case of magenta or yellow, as in the usual double pass scanning mode.

In this case, the effect of the double pass scanning is not obtained since the recording is conducted using a single color. In view of this, more preferably, recording is executed in the single pass scanning mode without accepting the double pass scanning mode by the first mode selecting section 65, or, still more preferably, a warning sound is generated or a message is displayed through a display section to thereby stop the apparatus, or, still more preferably, a warning sound is generated or a message is displayed through a display section to thereby inform the user of the situation and then instruct the operator to perform mode selection again.

In the case of green or blue, cyan and black inks are ejected in the first scanning pass, as in the normal mode, and magenta and yellow inks are ejected in the second scanning pass. Actually, the magenta and black image signals when recording in green are reduced to zero by masking, so that cyan ink is ejected in the first scanning pass, and yellow ink is ejected in the second scanning pass. Similarly, in the case of recording in blue, cyan ink is ejected in the first scanning pass, and magenta ink is ejected in the second scanning pass.

When the color selected is red, magenta ink is ejected in the first scanning pass, and yellow ink is ejected in the second scanning pass. This order may be reversed. However, with the same control as in the case of blue or green, magenta and yellow inks would be ejected in the second scanning pass, so it is necessary to change the control in this way.

As described above, the combination of ink-jet heads used in the double pass scanning mode is changed in accordance with the color selected for mono-color recording, whereby it is possible to obtain a satisfactory image that is free from beading or ink overflow by double pass scanning no matter what color may be selected.

(Modification of the Second Embodiment)

As stated with reference to the above embodiment, the color selected in the mono-color mode is not necessarily such as can be expressed using one or two color inks. For example, to express brown, the three colors cyan, magenta and yellow are needed. To express a red of low saturation, it is necessary to add black in addition to magenta and yellow. This embodiment is concerned with such cases.

The embodiment will be described with reference to a case in which brown is selected. To express brown, the coefficient settings in equation (4) are made such that $a_{11}$=0.4, $a_{21}$=0.6, and $a_{31}$=0.6, with the remaining coefficients being all set to zero. In this condition, when the double pass scanning mode is selected, the combination of ink-jet heads used is determined such that the maximum value of the total amount of ink ejected in one scanning is minimized. In this example, the maximum value of the total amount of ink ejected in one scanning is minimized when cyan and magenta inks are ejected in the same scanning pass or when cyan and yellow inks are ejected in the same scanning pass. As stated above, it is expedient that the positions of the ink-jet heads used for ejection in the same scanning pass be spaced apart as much as possible from each other since it helps to make time for the interval between the ejection of ink of one color and that of ink of the other color for printing. In this embodiment, the ink-jet heads are arranged in the order cyan, magenta, yellow and black, so that it is more desirable to eject cyan and yellow inks in the same scanning than to eject cyan and magenta inks in the same scanning pass. Therefore, in this embodiment, cyan and yellow inks are ejected in the first scanning pass, and magenta ink is ejected in the second scanning pass.

Also in the case in which the color selected for expression in mono-color is one to be expressed with four heads, the combination of heads is determined such that the total amount of ink ejected in the same scanning is minimized.

(Another Modification of the Second Embodiment)

While the second embodiment has been described with reference to a double pass scanning mode as a mode for coping with the requirement for high image quality, a satisfactory image quality cannot be obtained, in some cases, simply by dividing one scanning in half. This embodiment addresses such cases.

The embodiment will be explained with reference to a case in which the selected color is black. An ordinary black can be expressed simply with a single black ink. In some cases, however, a deeper black having a density as high as that of a print is desired for design uses or the like. In view of this, it is desirable to provide both a black expressed by a single black ink and a black of a higher density obtained by adding cyan, magenta and yellow to black ink so that the user can select between them. However, such a high-density black requires the ejection of a considerably large amount of ink.

In this embodiment, coefficient setting in equation (4) when the ordinary black (having an image density of approximately 1.4) is selected are made such that only $a_{41}$ is 1, with the remaining coefficients being set to zero. When a darker black having a high density (an image density of approximately 1.7) is selected, coefficient settings are made such that $a_{41}$=1 and $a_{11}$=$a_{21}$=$a_{31}$=0.6. When the darker black is selected, in the case of the same head combination as that in the normal double pass scanning, ejection is effected in the first scanning pass simply by a signal of 1.6*ND for cyan and black combine and, in the second scanning pass, ejection is effected simply by a signal of 1.2*ND for magenta and yellow combined. On the other hand, the limit of the image signal that allows ejection by the same scanning without causing serious beading, which depends on the kind of recording sheet used, is approximately 1.5*ND in the case of an OHP sheet. However, in this case, this limit will be exceeded with the double pass scanning no matter how the head combination may be changed. In view of this, in this embodiment, when a dark black is selected, recording is performed by dividing one scanning into thirds.

That is, when a dark black is selected, magenta and yellow inks are ejected in the first scanning pass; black ink is ejected in the second scanning pass; and cyan ink is ejected at the third scanning pass. The reason for ejecting magenta and yellow inks in the first scanning pass is that it is advantageous in terms of ink absorption if the first scanning pass, in which no ink yet has been used for printing, is the one in which the greatest amount of ink is ejected. The reason for ejecting black ink in the second scanning pass is that the amount of ink used in this scanning pass is the second greatest.

When the absorptively of the recording sheet is still poorer, it is possible to perform image recording by four scanning operations, applying one color in one scanning pass.

In this way, in a mode in which an image is recorded by a plurality of scanning operations, not only the head combination but also the number of times of scanning is changed in accordance with the color selected, whereby the range of colors that allows selection can be widened.

While the above embodiments have been described with reference to a case in which the color data for the mono-color mode is prepared through the variation of coefficients in a masking computation, this should not be construed restrictively. It is also possible to prepare color data by performing computations, as in the masking computations, on the R, G and B signals prior to the preparation of the C, M and Y signals, and varying the coefficients.

As described above, the recording conditions for the case in which the same area is recorded by a plurality of recording operations are changed in accordance with the recording medium used and the color selected for mono-color recording, whereby it is possible to determine the recording conditions such that the effect of the multiple pass recording can always be realized to the highest possible degree.

As a result, it is always possible to satisfactorily prevent beading using the multiple pass the recording as described above, thereby making it possible to effect high-quality image recording.

(Others)

The above embodiments have been described with reference to a recording head and a recording apparatus based on the ink-jet recording system and, in particular, to those of the type which are equipped with a means for generating heat energy as the energy to be utilized in effecting ink ejection (for example, electro-thermal converters, laser beam, etc.), the heat energy causing changes in the ink condition. By adopting such a system, it is possible to attain an enhancement in terms of density and definition.

Regarding typical constructions and principles thereof, it is desirable to adopt the basic principle as disclosed, for example, in U.S. Pat. Nos. 4,723,129 and 4,740,796. The system, which is applicable to both the so-called on-demand and continuous types, proves particularly effective when applied to an on-demand type apparatus, in which at least one driving signal corresponding to recorded information and causing a rapid temperature rise exceeding nucleate boiling is applied to electro-thermal converters arranged in correspondence with a sheet, liquid passages, etc. retaining a liquid (ink), whereby heat energy is generated in the electro-thermal converters to thereby cause film boiling on the thermal action surface of the recording head, with the result that a bubble which is in one-to-one correspondence with this driving signal is formed in the liquid (ink). By the growth and contraction of this bubble, some of the liquid (ink) is ejected through an ejection opening to thereby form at least one droplet. It is more desirable for this driving signal to have a pulse form, since that will make possible instantaneous and appropriate growth and contraction of bubbles, thereby achieving a liquid (ink) ejection which particularly excels in responsiveness. Suitable examples of this driving signal in a pulse form are disclosed in the specifications of U.S. Pat. Nos. 4,463,359 and 4,345,262. It is possible to achieve a still more excellent recording by adopting the conditions regarding the temperature rise ratio of the above thermal action surface disclosed in the specification of U.S. Pat. No. 4,313,124.

As to the construction of the recording head, the present invention covers, apart from the construction combining ejection openings, liquid passages and electro-thermal converters (linear liquid passages or square liquid passages), disclosed in the above-mentioned specifications, a construction in which the thermal action section is arranged in an bent area, as disclosed in the specifications of U.S. Pat. Nos. 4,558,333 and 4,459,600. Further, the present invention is also effective in a construction in which a common slit serves as the ejecting sections of a plurality of electro-thermal converters, as disclosed in Japanese Patent Laid-Open No. 59-123670, or in a construction in which an opening for absorbing pressure waves of heat energy is arranged in correspondence with the ejecting section, as disclosed in Japanese Patent Laid-Open No. 59-138461. That is, no matter what form the recording head may have, the present invention makes it possible to perform recording reliably and efficiently.

In addition, the present invention is also effective not only in a recording head of the serial type as described above, but also in a recording head secured to the body of the associated apparatus, a replaceable, chip-type recording head which, when attached to the associated apparatus, can be electrically connected thereto and supplied with ink therefrom, or a cartridge type recording head which is integrally provided with an ink tank.

Further, regarding the construction of the recording apparatus of the present invention, addition of a recording head ejection recovery means, a backup, auxiliary means, etc. is desirable since that further helps to stabilize the effect of the present invention. Specific examples of such means include a capping means for the recording head, cleaning means, pressurizing or sucking means, preliminary heating means for heating by using electro-thermal converters or heating elements that are separate therefrom, or a combination thereof, and preliminary ejection means for performing ejection different from that for recording.

Further, as to the type and number of recording heads to be mounted, it is possible to adopt, for example, a structure in which only one head is provided in correspondence with a single-color ink, or a structure in which a plurality of heads are provided in correspondence with a plurality of kinds of inks of different recording colors and densities. That is, the recording mode of the recording apparatus is not restricted to the one which uses only a main color, such as black; the present invention is very effective also in an apparatus having at least either a composite color recording mode using different colors or a full color recording mode using mixed colors, which can be realized either by forming the recording head as an integral unit or combining a plurality of heads.

Further, although in the above-described embodiments of the present invention the ink is liquid, it is also possible to use an ink which solidifies at room temperature or less and which softens or liquefies at room temperature, or, since in the ink-jet system the ink is generally temperature-adjusted within a temperature range of 30° C. to 70° C. to effect temperature control so that the viscosity of the ink remains within the range of stabilized ejection, it is also possible to use an ink which is liquid when the recording signal used is imparted thereto further, to positively prevent a temperature rise due to the heat energy by utilizing it as the energy for changing the ink from the solid to liquid state, or to prevent evaporation of the ink, it is possible to use an ink which solidifies when left unused and liquefies when heated. At any rate, the present invention is also applicable to cases in which an ink which liquefies only when heat energy is imparted thereto is used, as in the case in which the ink is liquefied for ejection by imparting heat energy thereto in correspondence with the recording signal, or in the case of an ink which starts to solidify on reaching the recording medium. As described in Japanese Patent Laid-Open No. 54-56847 or 60-71260, in such cases, the ink, which is in the liquid or solid state, can be held in recesses of a porous sheet or in through-holes, and, in this condition, opposed to electro-thermal converters. In the present invention, the above-described film boiling system, which is most effective for the inks described above, is employed.

In addition, apart from the image output terminal of an information processing apparatus, such as a computer, the ink-jet recording apparatus of the present invention may take, for example, the form of a copying machine combined with a reader or the like, or, further, a facsimile apparatus having transmitting and receiving functions.

What is claimed is:

1. An ink-jet image recording apparatus employing a plurality of scannable ink-jet heads, each of which ejects a different color of ink onto a recording medium to thereby record a color image, in accordance with record data, comprising:

scanning means for performing scanning by said ink-jet heads with respect to the recording medium;

setting means for setting a recording mode in which an image is recorded by performing scanning a plurality of times with respect to a same area of the recording medium by said scanning means; and control means for determining an ink-jet head to be used in each of the plurality of times of scanning in accordance with the record data corresponding to the color image to be recorded, and for controlling said scanning means in performing recording operation using the determined ink-jet head, when said recording mode is set by said setting means, wherein said control means determines an amount of each color of ink to be elected onto a same area of the recording medium in accordance with recording data for recording the color image, and determines the ink-jet head to be used in each of the plurality of times of scanning in accordance with the amount of each color of ink so that at least one of the ink-jet heads performs recording.

2. An ink-jet image recording apparatus employing a plurality of scannable ink-jet heads, each of which ejects a different color of ink onto a recording medium to thereby record an image, comprising:

scanning means for performing scans by said ink-jet heads with respect to the recording medium;

first mode setting means for setting a first mode in which a mono-color image is recorded;

second mode setting means for setting a second mode in which the image is recorded by performing a plurality of times of scans by said scanning means on a same area of the recording medium; and control means for control setting of said second mode by said second mode setting means in accordance with the color of mono-color image to be recorded, when the first mode is set by said first mode setting means.

3. An ink-jet image recording apparatus according to claim 2, wherein said recording scans include scanning with the ink-jet head, and wherein said recording condition controlled in accordance with the selected color is a combination of the ink-jet heads used for ejection in a single said recording scan.

4. An ink-jet image recording apparatus according to claim 2, wherein said recording scans include scanning with the ink-jet heads, and wherein said recording condition controlled in accordance with the selected color is a number of times that scanning is repeated with different said ink-jet heads for the same area.

5. An ink-jet image recording apparatus according to one of claims 2 through 4, wherein the color for the image recorded by mono-color recording is a color formed from an ink of a single color.

6. An ink-jet image recording apparatus according to one of claims 2 through 4, wherein the color for the image recorded by said mono-color recording is a color formed from a plurality of differently-colored inks.

7. An ink-jet image recording apparatus employing a plurality of ink-jet heads, each of which ejects a different color of ink onto a recording medium to thereby record a color image in accordance with record data, said ink-jet image recording apparatus comprising:

scanning means for performing scanning by said ink-jet heads with respect to the recording medium;

mode setting means for setting a mode in which an image is recorded by performing scanning a plurality of times with respect to a same area of the recording medium by said scanning means; and recording control means for controlling a number of scannings performed on a same area of the recording medium in accordance with record data, when the mode is set by said mode setting means;

wherein, when an image to be recorded is a mono-color image to be recorded by one of the ink-jet heads for an irk of a single color, said recording control means performs recording of the mono-color image using the one of the ink-jet heads one time, and does not perform a further recording scan, and when the image to be recorded is a mono-color image to be recorded by the plurality of ink-jet heads, said recording control means performs recording of the mono-color image using the plurality of ink-jet recording heads by the plurality of recording scannings, wherein at least one of the ink-jet heads performs recording in each of said plurality of times of recording scannings, and the ink-jet head used in each of the recording scannings differs from those used in other recording scannings.

8. An ink-jet image recording apparatus comprising:

a plurality of ink-jet heads, each of which ejects a different color of ink onto a recording medium;

scanning means for performing scans by said ink-jet heads with respect to a recording medium; and control means for controlling said scanning means so that an image is recorded by performing a plurality of recording scans by said ink-jet heads on a same area of the recording medium, wherein at least one of the ink-jet heads performs recording in each of the recording scans, and the ink-jet head used in each of the recording scans differs from those used in other recording scans, wherein said control means varies the number of times of said recording scans and order in which the ink-jet heads are used in recording, in accordance with a kind of said recording medium and the image to be recorded.

9. An ink-jet image recording apparatus according to one of claims 1, 2–4, 7 or 8, wherein each of said ink-jet heads include a heating member which generate bubbles in the inks using heat energy, and effects ink ejection through generation of said bubbles.

10. A method for recording a color image, comprising the steps of:

providing an ink-jet image recording apparatus employing a plurality of scannable ink-jet heads, and scanning means for performing scanning by said ink-jet heads with respect to a recording medium, each of the ink-jet heads ejects a different color of ink onto a recording medium during scanning by said scanning means in accordance with record data, to thereby record the image, wherein said apparatus records the image in a mode in which the color image is recorded by performing scanning a plurality of times with respect to a same area of the recording medium, determining the ink-jet head to be used in each of the plurality of scannings so that at least one ink-jet head performs recording in each of the scannings;

determining an amount of each color of ink to be ejected onto a same area of the recording medium in accordance with the record data;

determining the ink-jet head to be used in each of the plurality of times of scanning in accordance with the amount of each color of ink determined in the previous step; and recording the color image by performing a plurality of times of scannings on a same area of the recording medium, wherein the ink-jet head determined in said determining step is used in each of the scannings.

11. A method for recording a mono-color image comprising the steps of:

providing an ink-jet image recording apparatus which performs scanning employing a plurality of ink-jet heads, each of which ejects a different color of ink onto a recording medium to thereby record the image;

setting a mono-color mode in which the mono-color image is recorded;

determining a number of times of recording scan for performing a mono-color recording in accordance with the color of the mono-color image to be recorded; and recording the mono-color image by performing recording scan of the number of times determined in said determining step on a same area of the recording medium;

wherein, when said color of the mono-color image to be recorded is a color to be recorded by an ink-jet head for an ink of a single color, recording of the mono-color image is performed by one recording scan using the one of the ink-jet heads, and when the color of the mono-color image to be recorded is a color to be recorded by the plurality of ink-jet heads, recording of the mono-color image is performed by the plurality of recording scans, wherein at least one ink-jet head performs recording in each of the plurality of recording scans, and the ink-jet head used in each of the recording scans differs from those used in other recording scans.

12. A method for recording images, comprising the steps of:

providing an ink-jet image recording apparatus employing a plurality of ink-jet heads, each of which ejects a different color of ink onto a recording medium while scanning said ink-jet heads with respect to the recording medium to thereby effect recording the image;

determining a number of times of recording scans on the same area of the recording medium and order of using the ink-jet head to be used in recording, in accordance with a kind of the recording medium and the image to be recorded; and recording the image by performing the recording scans of the number of times determined in said determining step, using the ink-jet heads in the order determined in said determining step.

* * * * *

UNITED STATES PATENT AND TRADEMARK OFFICE
CERTIFICATE OF CORRECTION

PATENT NO. : 6,151,038
DATED : November 21, 2000
INVENTOR(S) : Akio Suzuki

It is certified that error appears in the above-identified patent and that said Letters Patent is hereby corrected as shown below:

Column 1,
Line 16, "being" should be deleted;
Line 49, "absorptively" should read -- absorptivity --;
Line 58, "absorptively" should read -- absorptivity --.

Column 2,
Line 4, "time as" should read as follows:
-- time as compared to the case in which inks of all the colors are ejected in a single scan, it proves substantially effective in terms of image quality. In view of this, it is expedient to provide a single-pass mode for high-speed recording and a double pass scanning mode for high image quality so that it is possible to select between the two modes according to the purpose, which arrangement enables the apparatus as a whole to be improved in terms of efficiency.

Generally speaking, in the case of the double pass scanning mode, the combination of the color of inks to be ejected in each scan is determined, taking various factors into consideration, such that the effect of the double pass scanning is maximum for average images. In some cases, however, when the combination is fixed, the effect of the double pass scanning cannot be obtained to a satisfactory degree, depending upon the kind of image to be recorded.

This problem will be explained taking as an example an apparatus in which four ink-jet heads of cyan, magenta, yellow and black are arranged in this order. According to the results of examinations conducted by the present applicant, when recording in different colors superimposed one upon the other, beading is least conspicuous when magenta and yellow are superimposed one upon the other. Thus, it is desirable to combine magenta and yellow so that they may be ejected in the same scanning pass. Further, in --;
Lines 29-52 should be deleted;
Line 53, "be ejected in the same scanning pass. Further, in" should be deleted.

Column 3,
Line 27, "aspects" should read -- aspect --;
Line 30, "and in" should read -- and it --; and
Line 60, "controls mean" should read -- control means --.

UNITED STATES PATENT AND TRADEMARK OFFICE
CERTIFICATE OF CORRECTION

PATENT NO. : 6,151,038
DATED : November 21, 2000
INVENTOR(S) : Akio Suzuki

It is certified that error appears in the above-identified patent and that said Letters Patent is hereby corrected as shown below:

Column 4,
Line 12, "an other" should read -- another --; and
Line 28, "an other" should read -- another --.

Column 5,
Line 59, "value" should read -- values --.

Column 6,
Line 16, "absorptively" should read -- absorptivity --;
Line 21, "signal 66 are" should read -- signal 66 is --;
Line 46, "signal 68 are" should read -- signal 68 is --;
Line 50, "(original" should read -- original --;
Line 51, "given)." should read -- given.) --; and
Line 54, "section" should read -- circuit --.

Column 7,
Line 39, "values" should read -- value --;
Line 57, "scanning" should read -- scanning pass --; and
Line 60, "scanning" should read -- scanning pass --.

Column 8,
Line 26, "amount" should read -- amount of --; and
Line 65, "same" should read -- the same --.

Column 11,
Line 55, "combine" should read -- combined --.

Column 12,
Line 35, "pass the" should read -- pass in the --.

Column 13,
Line 14, "in an" should read -- in a --.

UNITED STATES PATENT AND TRADEMARK OFFICE
CERTIFICATE OF CORRECTION

PATENT NO. : 6,151,038
DATED : November 21, 2000
INVENTOR(S) : Akio Suzuki

It is certified that error appears in the above-identified patent and that said Letters Patent is hereby corrected as shown below:

Column 14,
Line 2, "thereto further," should read -- thereto. Further, --;
Line 46, "elected" should read -- ejected --.

Column 15,
Line 4, "head," should read -- heads, --; and
Line 39, "irk" should read -- ink --.

Column 16,
Line 6, "claims 1, 2-4" should read -- claims 1 to 4 --;
Line 7, "generate" should read -- generates --; and
Line 40, "image" should read -- image, --.

Signed and Sealed this

Thirteenth Day of November, 2001

*Attest:*

Nicholas P. Godici

NICHOLAS P. GODICI

*Attesting Officer*

*Acting Director of the United States Patent and Trademark Office*